Patented June 14, 1949

2,473,431

UNITED STATES PATENT OFFICE 2,473,431

TREATMENT OF CRUDE PETROLEUM OIL

Charles O. Hoover, Houston, Tex., assignor to Air Reduction Company, Incorporated, New York, N. Y., a corporation of New York No Drawing. Application October 2, 1946, Serial No. 700,825

21 Claims. (Cl. 196—44)

This invention relates to a process for treating crude petroleum oils containing unstable inorganic compounds which ionize or decompose to yield corrosive compounds, whereby the corrosiveness of such oils due to the presence of such compounds is eliminated or greatly decreased, and distillates formed therefrom are free or substantially free of corrosive compounds formed as a result of the decomposition of the unstable inorganic compounds contained in the crude oil.

Practically all crude oil as obtained from the well is contaminated with inorganic salts such as the chlorides or sulfates of calcium, magnesium, iron and sodium dissolved in water emulsified with the oil. This so-called brine varies considerably both as to salt content and composition. It is the usual practice in the industry to subject the oil and brine emulsified therein as it comes from the ground to treatment whereby most of the brine is separated from the oil. However, there is a residual, difficulty separable portion of the brine which is not readily removable by conventional treatment of the crude oil which accompanies the oil and subsequently is subjected to the higher temperatures involved in the distillation and fractionation of the crude. Also, many crudes contain in addition to the brine just referred to, hydrogen sulfide which is highly corrosive and which during transportation and treatment of the oil oxidizes to liberate free sulfur which reacts with other compounds present in the crude to form corrosive sulfur compounds.

The calcium, magnesium and iron salts of the brine are particularly unstable at the temperatures encountered in the distillation of the crude oil. On distillation of the oil, they decompose, possibly in part as a result of hydrolysis due to the presence of water in the oil, and liberate hydrochloric, sulfurous, or sulfuric acid. These acids cause much corrosion to refinery equipment, heaters, stills, condensers, heat exchangers and the like with consequent loss of productive capacity, as a result of shut-downs, to say nothing of the cost of deteriorated equipment. Since both hydrochloric and sulfurous acids are volatile, the distillate obtained under these circumstances may contain these acids with all the consequent disadvantages due to corrosion and the necessity for subsequent neutralization.

It heretofore has been proposed to treat crude oil containing brine with sodium hydroxide solution for the purpose of reacting with the calcium, magnesium and iron salts present in the brine to form the corresponding hydroxides which are precipitated. Such processes are difficult to operate because of the very stable emulsions which are formed, and in general are not a satisfactory means for solving the problem of brine corrosion.

The present invention provides a simple and inexpensive process for treating crude oils containing brine or hydrogen sulfide, or both, whereby the corrosion resulting from the presence of such compounds or decomposition products thereof is eliminated or greatly reduced.

More particularly, the invention contemplates a process in which crude oil containing brines or hydrogen sulfide, or both, are treated with an alkali-metal soap or salt of a water-insoluble organic acid, such as the sodium, potassium or lithium salts of naphthenic, tall-oil, oleic, stearic, linoleic and resin acids at some stage prior to its distillation for the purpose of reacting with the undesirable brine salts, usually salts of iron, calcium and magnesium, or hydrogen sulfide which is present, or both, to produce relatively stable oil-soluble compounds which do not appreciably ionize, or readily decompose and yield undesirable or corrosive acids.

When crude oil containing undesirable brines or hydrogen sulfide is reacted with an alkali-metal soap of a water-insoluble organic acid the alkali-metal part of the soap replaces the metal part of the inorganic salts, or the hydrogen of the hydrogen sulfide, to yield a water-soluble alkali-metal salt which will dissolve in the dilute brine contained in the crude oil, and a calcium, magnesium or iron salt of the water-insoluble organic acid which is oil-soluble and which dissolves in the crude oil and is carried through the distillation process and remains in the residue of distillation, or else decomposes during the distillation, if the distillation is carried out at sufficiently high temperatures, to yield the corresponding organic acid and a non-corrosive salt.

The reaction between the alkali-metal soaps and the unstable inorganic compounds present in the brine and with hydrogen sulfide is illustrated by the following equations:

$MgCl_2 + 2$ sodium naphthenate $=$
$2\ NaCl + Mg$ naphthenate $FeCl_2 + 2$ sodium naphthenate $=$
$2\ NaCl + Ca$ naphthenate $FeCl_2 + 2$ sodium naphthenate $=$
$2\ NaCl + Fe$ naphthenate $H_2S + 2$ sodium naphthenate $=$
$2\ NaS + $ naphthenic acid While sodium naphthenate is used in the above equations, the reaction is the same for other alkali-metal soaps of water-insoluble acids, such as the sodium, potassium or lithium soaps of naphthenic, tall-oil, oleic, stearic, linoleic and resin acids. Likewise, a similar reaction takes place when the magnesium, calcium or iron salt in the brine is a sulfate.

The sodium chloride formed as a result of the reaction of the sodium soap with the inorganic salt contained in the brine is thermally much more stable than the calcium, magnesium or iron chloride which was present in the crude oil and will undergo little or no decomposition at distillation temperatures. The sodium sulfide formed by reaction of the alkali-metal soap is unstable; consequently when the crude contains hydrogen sulfide it is washed with water after the reaction and prior to distillation in order to remove the sodium sulfide which is formed. If the crude does not contain any appreciable quantity of hydrogen sulfide, such water washing after reaction with the sodium napthenate is unnecessary and the oil can be passed, if desired, directly from the reaction chamber to the distillation operation, after passing through the usual settling tanks for further elimination of brine, if desired.

The crude oil as it comes from the well is emulsified with up to 60% or more of dilute brine. After treatment with an emulsion breaker it is run into a separation chamber where the major portion of the oil separates as a supernatant layer on the brine and is drawn off and subsequently subjected to settling in one or more settling tanks where further amounts of the brine settle out and are withdrawn; after which the crude is subjected to distillation or fractionation. Preferably, the crude is treated with the alkali-metal soap after it has been subjected to the initial separation operation to remove the major portion of the brine and before being subjected to further separation in the settling tanks. However, if desired it may be added at any stage in the operation prior to the distillation or other heat treatment of the oil. It is advantageous to add the alkali-metal soaps as shortly after the oil comes from the well as possible as by immediately neutralizing the corresiveness of the oil there is less deterioration of the pumps, pipe lines and other equipment through which the crude oil passes from the well to the point at which it is subjected to distillation or other heat treatment.

Preferably, the alkali-metal soaps are introduced into a flowing stream of the crude by means of a suitable mixer or other device, which brings it into intimate contact with the calcium, magnesium, iron or other unstable inorganic salts contained in the crude. When so introduced, reaction between the alkali-metal soap and the inorganic salts is substantially instantaneous. If the alkali-metal soap is not introduced into the oil as just indicated, and is introduced into the oil while in a tank or other chamber, agitation for a suitable period may be necessary in order to obtain a uniform distribution of the alkali-metal soap through the crude in order to bring it into intimate contact with the inorganic salts present.

The amount of brine contained in crudes will vary widely, both with respect to the source of the crude and the age of the field. It generally is expressed in terms of pounds of salt per 1,000 barrels of crude and may vary from 5 to 600 pounds of salt per 1,000 barrels of crude.

The amount of the alkali-metal soap which is added to the crude to react with the unstable inorganic salts, or the hydrogen sulfide present, will vary in accordance with the amount of those compounds present in the crude at the time the alkali-metal soap which is added preferably will be slightly in excess of the stoichiometric equivalent of the calcium, magnesium and iron salts remaining dispersed in the crude oil, or slightly in excess of the stoichiometric equivalent of those salts and hydrogen sulfide present in the oil at the time it is subjected to the treatment with the alkali-metal soap.

The reaction of the alkali-metal soap with the unstable inorganic salts of the brine and with the hydrogen sulfide may be carried out at atmospheric pressure and atmospheric temperature or slightly above. However, in order to avoid distilling of the lighter fractions of the crude oil, it ordinarily is desirable that the temperature at which the reaction is carried out not exceed the initial boiling point of the crude. The use of a higher temperature would necessitate the provision of some means for recovering the lighter fractions of the crude which would be distilled off, or else entail their loss.

Typical of crudes which have been treated with alkali-metal soaps in the manner set forth above are three from Southern Texas in which the constituents of the brine is as indicated in the following table:

[Parts per million]

| Constituents | Loma Novia | Wade City | Plymouth |
| --- | --- | --- | --- |
| Sodium (Na) | 3,098 | 11,472 | 21,438 |
| Iron (Fe) | 169 | 164 | 93 |
| Calcium (Ca) | 20 | 493 | 448 |
| Magnesium (Mg) | 212 | 10 | 159 |
| Bicarbonate (HCO$_3$) | 642 | 522 | 226 |
| Sulfate (SO$_4$) | 2 | 4 | 130 |
| Chloride (Cl) | 5,273 | 18,560 | 34,216 |
| Mineral Residue | 8,496 | 33,006 | 60,298 |

It has been found that when crudes containing unstable inorganic salts and hydrogen sulfide, such as those described above, are treated in accordance with the present invention, the unstable inorganic salts and any hydrogen sulfide present are substantially completely reacted with the alkali-metal soap to form water-soluble alkali-metal salts, which are separable on subsequent settling or washing with water, and oil-soluble organic salts which dissolve in the oil and are sufficiently stable that they do not appreciably ionize, or decompose during subsequent heat treatment of the oil to form corrosive compounds. It also has been found that when crude oil treated in the manner herein described subsequently is subjected to distillation, the pH of the various distillates will run close to the neutral point. It has been possible to fairly consistently obtain distillates having a pH as high as 6.5, whereas, similar distillates from the same crude oil not treated as set forth herein have a pH of about 2.3.

From the aforegoing, it will be apparent that the present invention provides an extremely simple and inexpensive method of eliminating or greatly decreasing the corrosiveness of crude oil and that little or no additional aquipment is required in order to carry out the process. It is only necessary that the treating agent be added to the crude oil in the proper proportions to react with the unstable inorganic salts and any hydrogen sulfide present in the crude. A simple pump will suffice. Furthermore, the reagent may be added anywhere along the line after that portion of the brine which readily is separable from the crude oil has been removed.

As the sodium naphthenate and other alkali-metal soaps which are used in accordance with the present invention to eliminate corrosion in the oil are wetting agents, they tend to enhance the contact of oil and brine droplets and consequently enhance the reaction between the alkali-metal soaps and the unstable inorganic salts contained in the brine. Also, neither the alkali-metal soaps nor the products of their reaction with the inorganic metal salts of the brine has any apparent deleterious effect upon metal equipment when subjected to the maximum temperatures encountered in subsequent heat treatment of the oil. This is not true of alkali-metal hydroxides which it heretofore has been proposed to use in the neutralization of objectionable inorganic salts contained in the brine emulsified with the crude oil. Hot sodium hydroxide will cause serious embrittlement of steel and, therefore, its use is exceedingly objectionable from that standpoint.

Various changes may be made in the details of the procedure without departing from the invention or sacrificing any of the advantages thereof.

I claim:

1. The method of reducing the corrosiveness of petroleum crude oil containing solutions of inorganic salts which are unstable at the temperature to which the oil subsequently is subjected to obtain distillates therefrom, and distillates obtained therefrom, which comprises treating the crude oil with an alkali-metal soap of a water-insoluble organic acid, and subsequently subjecting the oil to heat treatment to obtain distillates therefrom.

2. The method of reducing the corrosiveness of petroleum crude oil containing inorganic salts of calcium, magnesium and iron, and distillates obtained therefrom, which comprises treating the crude oil with an alkali-metal soap of a water-insoluble organic acid in amount at least equal to the stoichiometric equivalent of said inorganic salts present in the oil, whereby said inorganic salts are converted into water-soluble inorganic salts of the alkali metal of the alkali-metal soap and oil-soluble organic compounds of the metals of the inorganic salts and the organic radical of the alkali-metal soap, and subsequently subjecting the oil having said oil-soluble organic compounds dissolved therein to heat treatment to obtain distillates therefrom.

3. The method of reducing the corrosiveness of naturally-occurring petroleum crude oil resulting from the presence of compounds naturally occurring therein which are unstable at temperatures to which the crude oil subsequently may be subjected for distillation which comprises adding to the crude oil an alkali-metal soap of a water-insoluble organic acid prior to heat treatment thereof to form distillates.

4. The method of reducing the corrosiveness of naturally-occurring petroleum crude oil as set forth in claim 3 in which the naturally-occurring unstable compounds are solutions of inorganic salts.

5. The method of reducing the corrosiveness of naturally-occurring petroleum crude oil as set forth in claim 3 in which the alkali-metal soap is an alkali-metal naphthenate.

6. The method of reducing the corrosiveness of naturally-occurring petroleum crude oil as set forth in claim 3 in which the naturally-occurring unstable compounds are solutions of inorganic salts and in which the alkali-metal soap is an alkali-metal naphthenate.

7. The method of reducing the corrosiveness of naturally-occurring petroleum crude oil as set forth in claim 3 in which the alkali-metal soap is sodium naphthenate.

8. The method of reducing the corrosiveness of naturally-occurring petroleum crude oil as set forth in claim 3 in which the alkali-metal soap is an alkali-metal tallate.

9. The method of reducing the corrosiveness of naturally-occurring petroleum crude oil as set forth in claim 3 in which the alkali-metal soap is sodium tallate.

10. The method of reducing the corrosiveness of naturally-occurring petroleum crude oil as set forth in claim 3 in which the unstable compounds naturally occurring in the crude oil are inorganic salts of calcium, magnesium and iron and in which the amount of alkali-metal soap is at least the stoichiometric equivalent of said inorganic salts present in the oil.

11. The method of reducing the corrosiveness of naturally-occurring petroleum crude oil as set forth in claim 3 in which naturally-occurring unstable compounds are inorganic salts of calcium, magnesium and iron, the alkali-metal soap is an alkali-metal naphthenate, and in which the amount of the alkali-metal naphthenate present is at least the stoichiometric equivalent of said inorganic salts present in the oils.

12. The method of reducing the corrosiveness of naturally-occurring petroleum crude oil as set forth in claim 3 in which the temperature at which the crude oil is treated with the alkali-metal soap is a temperature below the initial boiling point of the oil.

13. The method of reducing the corrosiveness of naturally-occurring petroleum crude oil as set forth in claim 3 in which the temperature at which the oil is treated with an alkali-metal soap is below the initial boiling point of the oil and the pressure is substantially atmospheric.

14. The method of reducing the corrosiveness of naturally-occurring petroleum crude oil as set forth in claim 3 in which the crude oil to which the alkali-metal soap has been added is subsequently subjected to heat treatment to obtain distillates therefrom.

15. The method of reducing the corrosiveness of naturally-occurring petroleum crude oil as set forth in claim 3 in which the alkali-metal soap is an alkali-metal naphthenate and the oil to which the naphthenate has been added subsequently is subjected to heat treatment to obtain distillates therefrom.

16. The method of reducing the corrosiveness of naturally-occurring crude oil resulting from the presence of hydrogen sulfide, which is unstable at temperatures to which the crude oil subsequently may be subjected for distillation, which comprises adding to the crude oil an alkali-metal soap of a water-insoluble organic acid whereby the soap reacts with the hydrogen sulfide to form alkali-metal sulfide, and eliminating the thus-formed alkali-metal sulfide prior to heat treatment thereof to form distillates.

17. The method of reducing the corrosiveness of naturally-occurring crude oil as set forth in claim 16 in which the alkali-metal soap is sodium naphthenate and the alkali-metal sulfide formed is sodium sulfide.

18. The method of treating naturally-occurring crude oil containing naturally-occurring compounds, which are unstable at temperatures to which the crude oil is subjected to distillation, and an alkali-metal soap of a water-insoluble organic acid which comprises heating the naturally-occurring crude oil containing the naturally-occurring compounds and the alkali-metal soap to temperatures necessary to effect distillation.

19. The method of treating naturally-occurring crude oil containing naturally-occurring compounds, which are unstable at temperatures to which the crude oil is subjected to distillation, and sodium naphthenate which comprises heating the naturally-occurring crude oil containing the naturally-occurring compounds and the sodium naphthenate to temperatures necessary to effect distillation.

20. In the distillation of naturally-occurring petroleum crude oil, the step of reducing the corrosiveness of the oil resulting from the presence of compounds naturally occurring therein which are unstable at the distillation temperatures, by intimately admixing with the oil, prior to the distillation thereof, an alkali-metal soap of a water-insoluble organic acid.

21. In the distillation of naturally-occurring petroleum crude oil, the step of reducing the corrosiveness of the oil resulting from the presence of compounds naturally occurring therein as set forth in claim 20, in which the alkali-metal soap is an alkali-metal naphthenate.

CHARLES O. HOOVER.

REFERENCES CITED

The following references are of record in the file of this patent:

UNITED STATES PATENTS

| Number | Name | Date |
|---|---|---|
| 1,740,584 | Gardner et al. | Dec. 24, 1929 |
| 2,025,766 | Mead | Dec. 31, 1935 |
| 2,068,979 | Fisher | Jan. 26, 1937 |
| 2,091,239 | Hall | Aug. 24, 1937 |
| 2,408,011 | Walsh et al. | Sept. 24, 1946 |